(12) United States Patent
Ho et al.

(10) Patent No.: US 9,092,413 B1
(45) Date of Patent: *Jul. 28, 2015

(54) SYSTEM AND METHOD FOR PROVIDING ONLINE DATA MANAGEMENT SERVICES

(71) Applicant: Google Inc., Mountain View, CA (US)

(72) Inventors: Ronald Ho, Fremont, CA (US); Zach Lloyd, New York, NY (US); Joseph Berceli-Wain, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,785

(22) Filed: Jul. 12, 2013

Related U.S. Application Data

(63) Continuation of application No. 13/300,792, filed on Nov. 21, 2011, now Pat. No. 8,510,266.

(60) Provisional application No. 61/448,715, filed on Mar. 3, 2011.

(51) Int. Cl.
*G06F 7/00* (2006.01)
*G06F 17/00* (2006.01)
*G06F 17/24* (2006.01)

(52) U.S. Cl.
CPC .................................. *G06F 17/246* (2013.01)

(58) Field of Classification Search
CPC .......... G06F 17/246; G06F 2221/2147; G06F 17/2288; G06F 17/30168; Y10S 707/99954; Y10S 707/99938
USPC .......................................................... 707/609
See application file for complete search history.

(56) References Cited

U.S. PATENT DOCUMENTS

| | | | |
|---|---|---|---|
| 6,564,246 B1 * | 5/2003 | Varma et al. ................... | 709/205 |
| 6,681,369 B2 * | 1/2004 | Meunier et al. ............... | 715/255 |
| 6,898,642 B2 * | 5/2005 | Chafle et al. ................... | 709/248 |
| 7,233,951 B1 * | 6/2007 | Gainer et al. ......................... | 1/1 |
| 7,386,535 B1 | 6/2008 | Kalucha et al. | |
| 7,467,192 B1 * | 12/2008 | Lemler et al. ................. | 709/223 |
| 7,698,636 B2 | 4/2010 | Mohamed | |
| 7,756,824 B2 * | 7/2010 | Campbell et al. ............. | 707/610 |
| 7,827,483 B2 | 11/2010 | Unbedacht et al. | |
| 8,307,119 B2 * | 11/2012 | Rochelle et al. .............. | 709/248 |
| 8,417,666 B2 * | 4/2013 | Bailor et al. ................... | 707/608 |
| 2002/0143780 A1 * | 10/2002 | Gorman ........................ | 707/100 |
| 2004/0220977 A1 * | 11/2004 | Cho et al. ...................... | 707/201 |
| 2006/0136511 A1 * | 6/2006 | Ngo et al. ...................... | 707/203 |
| 2007/0233811 A1 * | 10/2007 | Rochelle et al. .............. | 709/219 |
| 2009/0006936 A1 * | 1/2009 | Parker et al. .................. | 715/200 |
| 2009/0112937 A1 * | 4/2009 | Campbell et al. ............. | 707/201 |
| 2009/0125518 A1 * | 5/2009 | Bailor et al. ........................ | 707/8 |
| 2009/0282462 A1 * | 11/2009 | Skaria et al. ...................... | 726/3 |

* cited by examiner

*Primary Examiner* — Binh V Ho
(74) *Attorney, Agent, or Firm* — Ropes & Gray LLP

(57) ABSTRACT

Access to first data is provided to a first user and to a second user. A specified change is received from the first user. Access to second data generated based on the first user's specified change is provided only to the first user. The first data is updated based on the specified change, in response to a selection by the first user of an option to apply the specified change to the first data. Simultaneous access to the updated first data is provided to the first user and to the second user.

20 Claims, 6 Drawing Sheets

SYSTEM AND METHOD FOR PROVIDING ONLINE DATA MANAGEMENT SERVICES

This application is a continuation of U.S. patent application Ser. No. 13/300,792, filed on Nov. 21, 2011, and entitled "System and Method for Providing Online Data Management Services," which claims the benefit of U.S. Provisional Patent Application No. 61/448,715, filed Mar. 3, 2011, which is are hereby incorporated by reference herein.

TECHNICAL FIELD

This specification relates generally to systems and methods for providing online services, and more particularly to systems and methods for providing online data management services.

BACKGROUND

Online spreadsheet management applications allow users to create and manipulate spreadsheet data via a network, and maintain the data at a remote location. Current spreadsheet management applications offer many common spreadsheet functions, including formatting, graphing, filtering, etc. In addition, some online spreadsheet management applications facilitate collaboration by allowing multiple users to access a spreadsheet data set simultaneously. Typically, when one of the collaborating users makes a change to the shared spreadsheet data set, the change is made to the data set and can be seen by the other collaborating users.

SUMMARY OF THE INVENTION

In accordance with an embodiment of the invention, a method for providing online data management services is provided. Access to first data is provided to a first user and to a second user. For example, the first user and to the second user may be allowed to access the first data simultaneously. A specified change is received from the first user. Access to second data generated based on the first user's specified change is provided only to the first user. The first data is updated based on the specified change, in response to a selection by the first user of an option to apply the specified change to the first data. Simultaneous access to the updated first data is provided to the first user and to the second user.

In one embodiment, access to the first data is provided to the first user via a first network browser operating on a first user device, and access to the first data is provided to the second user via a second network browser operating on a second user device.

In one embodiment, a selection of a preview option is received from the first user, and in response to the selection, access to the second data is provided only to the first user. A request that the first user device display the second data may be transmitted to the first user device. A first request to display the first data in a first window, and a second request to display the second data in a second window, may be transmitted to the first network browser.

The first data may be stored in a first memory location, and the second data may be stored in a second memory location. A first thread associated with the first data, and a second thread associated with the second data, may be maintained.

In one embodiment, filter criteria are received from the first user, and the second data is filtered based on the filter criteria.

The first data may comprise at least one of: spreadsheet data, text data generated by a word processing application, graphical data, image data, and slide show data.

In accordance with another embodiment of the invention, a method for providing online data management services is provided. First information adapted to cause a user device to display a first representation of a first data set maintained by an online document processing service is transmitted. A first selection of a first option to activate a preview mode with respect to the first data set is received, and a second data set is generated based on the first data set; in response to the first selection. Second information adapted to cause the user device to display simultaneously a second representation of the first data set and a third representation of the second data set is transmitted. The second data set is updated based on an input received from the user device, and the first data set is updated based on the updated second data set, in response to a second selection of a second option to update the first data set received from the user device.

In another embodiment of the invention, a graphical user interface is provided, comprising a first region for displaying a representation of a first data set stored at an online data management service. The graphical user interface also comprises a preview mode option for activating a preview mode, wherein a selection of the preview mode option initiates generation of a second data set based on the first data set and a simultaneous display of the first region and a second region for displaying a second representation of the second data set.

In accordance with another embodiment of the invention, an apparatus is provided. The apparatus comprises means for providing simultaneous access to first data to a first user and to a second user, and means for receiving a specified change from the first user. The apparatus further comprises means for providing, only to the first user, access to second data generated based on the first user's specified change. The apparatus also comprises means for updating the first data based on the specified change, in response to a selection by the first user of an option to apply the specified change to the first data.

In accordance with another embodiment of the invention, an apparatus is provided. The apparatus comprises means for transmitting a first request that a user device display a first data set maintained by an online document processing service, means for receiving a first selection of a preview mode with respect to the first data set, and means for generating a second data set based on the first data set, in response to the first selection. The apparatus also comprises means for transmitting at least one second request that the user device display the first data set and the second data set, means for updating the second data set based on an input received from the user device, and means for updating the first data set based on the updated second data set, in response to a second selection of an option to update the first data set received from the user device.

These and other advantages of the present disclosure will be apparent to those of ordinary skill in the art by reference to the following Detailed Description and the accompanying drawings.

DETAILED DESCRIPTION

Figure 1:
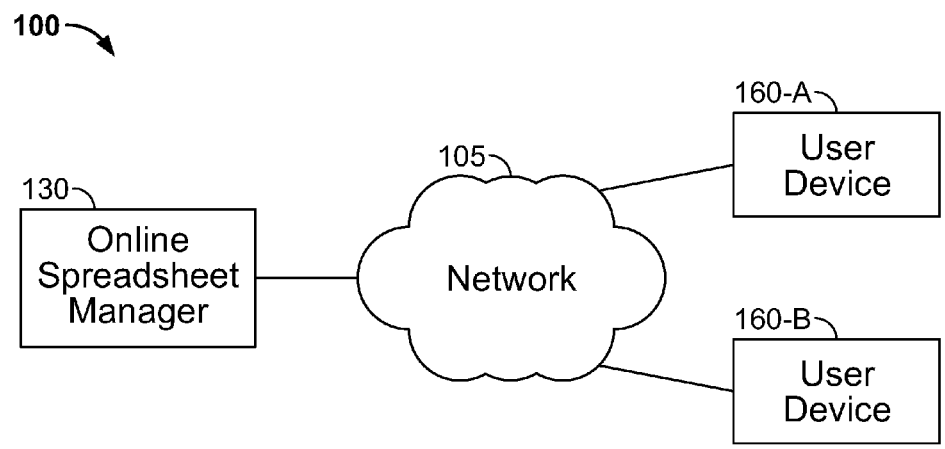
FIG. 1 shows a communication system that may be used to provide online services in accordance with an embodiment.

FIG. 1 shows a communication system 100 that may be used to provide online services in accordance with an embodiment. Communication system 100 comprises a network 105, an online spreadsheet manager 130, and user devices 160-A, 160-B, etc. For convenience, the term "user device 160" is used herein to refer to any one of user devices 160-A, 160-B, etc. Accordingly, any discussion herein referring to "user device 160" is equally applicable to each of user devices 160-A, 160-B, etc. Communication system 100 may comprise more or fewer than two user devices.

In the exemplary embodiment of FIG. 1, network 105 is the Internet. In other embodiments, network 105 may comprise one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may comprise a combination of different types of networks.

Online spreadsheet manager 130 provides spreadsheet data management services to users via network 105, enabling users to create, display, analyze, filter, and edit spreadsheet data sets remotely. Online spreadsheet manager 130 may be accessible via a World Wide Web page that may be viewed using a conventional Web browser, for example. A user may be required to log into a respective user account to access his or her spreadsheet data. Online spreadsheet manager 130 may offer common spreadsheet management features such as formatting, graphing, filtering, etc.

Online spreadsheet manager 130 allows multiple users to access a single spreadsheet data set simultaneously. For example, a group of users wishing to collaborate may access a spreadsheet data set simultaneously and view changes made by others. In one embodiment, a first user who creates a spreadsheet data set may specify one or more additional users who are permitted access to the spreadsheet data set. The first user may specify the level of access (e.g., read only, edit, etc.) granted to each of the additional users. Subsequently, any of the additional specified users, after logging into his or her respective user account, may access the spreadsheet data set created by the first user. More than one user may access the spreadsheet data set simultaneously.

User device 160 may be any device that enables a user to communicate via network 105. User device 160 may be connected to network 105 through a direct (wired) link, or wirelessly. User device 160 may have a display screen (not shown) for displaying information. For example, user device 160 may be a personal computer, a laptop computer, a workstation, a mainframe computer, etc. Alternatively, user device 160 may be a mobile communication device such as a wireless phone, a personal digital assistant, etc. Other devices may be used.

Figure 2:
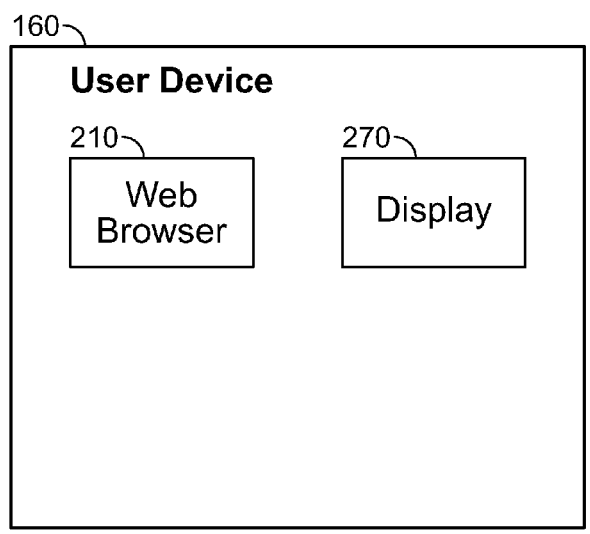
FIG. 2 shows functional components of an exemplary user device.

FIG. 2 shows functional components of an exemplary user device 160. User device 160 comprises a web browser 210 and a display 270. Web browser 210 may be a conventional web browser used to access World Wide Web sites via the Internet, for example. Display 270 displays spreadsheet data, documents, Web pages, and other information to a user. For example, a spreadsheet data set that a user creates or edits may be displayed on display 270. User device 160 may include other components in addition to those shown in FIG. 2.

Figure 3:
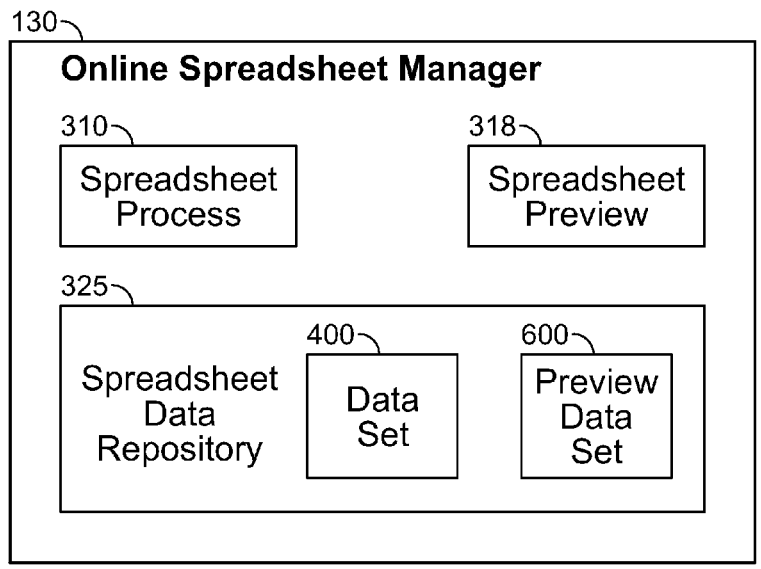
FIG. 3 shows functional components of an online spreadsheet manager in accordance with an embodiment.

FIG. 3 shows functional components of online spreadsheet manager 130 in accordance with an embodiment. Online spreadsheet manager 130 comprises a spreadsheet process 310, a spreadsheet preview 318, and a spreadsheet data repository 325. Spreadsheet process 310 manages spreadsheet data and performs spreadsheet operations requested by users, such as mathematical operations, graphing, filtering, etc. Spreadsheet data sets created by users are stored in spreadsheet data repository 325. A spreadsheet data set created by a user may be stored in association with his or her user account, for example. Multiple versions of a user's spreadsheet data set may be stored in spreadsheet data repository 325. Spreadsheet preview 318 provides, upon a user's request, a preview mode for viewing a spreadsheet data set, as discussed in more detail below. Online spreadsheet manager 130 may comprise other components in addition to those shown in FIG. 3.

In accordance with the embodiment of FIG. 1, a user may access online spreadsheet manager 130 and create and/or edit a spreadsheet data set. For example, a user may employ browser 210 to access a World Wide Web site maintained by online spreadsheet manager 130. The user may be required to authenticate his or her identity, e.g., by entering a user name and password, before accessing his or her user account and spreadsheet data associated with the account.

When a document, such as a spreadsheet data set is created and stored, online spreadsheet manager 130 may grant access rights to one or more users with respect to the spreadsheet data set. For example, certain users may be granted viewing and editing rights while other users are granted viewing rights only. Access to a document may be blocked to users who do not have access rights.

By way of example, suppose that a user wishes to utilize a spreadsheet to record how many points various users have accumulated in a particular game. Accordingly, the user accesses online spreadsheet manager 130 and creates a spreadsheet data set 400, illustrated in FIG. 4.

In a well-known manner, online spreadsheet manager 130 transmits data causing user device 160 to display a representation of all or a portion of spreadsheet data set 400 on a Web page. For example, online spreadsheet manager 130 may transmit to browser 210 a request, in the form of HyperText Markup Language (HTML), adapted to cause browser 210 to display a representation of spreadsheet data set 400 in a window. In response, browser 210 displays all or a portion of spreadsheet data set 400 in a window 407 shown on display 270. In a conventional manner, browser 210 displays spreadsheet data set 400 as a plurality of cells arranged in rows and columns. Browser 210 also displays a toolbar 415 which may display various available options and/or functions available to the user, such as a file function 417. When the user edits and saves spreadsheet data set 400, the updated spreadsheet data set is stored in spreadsheet data repository 325.

In the present example, the user enters, in rows 421-428, information identifying various users (Users 1-8), and a score associated with each respective user. For example, row 421 identifies "User 1" and indicates that "User1" has accumulated 260 points; row 422 identifies "User 2" and indicates that "User2" has accumulated 1512 points, etc. Referring again to FIG. 3, online spreadsheet manager 130 stores spreadsheet data set 400 in spreadsheet data repository 325, as shown in FIG. 3.

As discussed above, multiple users having access rights to spreadsheet data set 400 may log into their respective accounts with online spreadsheet manager 130 and access spreadsheet data set 400 simultaneously. Suppose, for example, that a first user, employing user device 160-A, accesses spreadsheet data set 400, and that a second user, employing user device 160-B, simultaneously accesses spreadsheet data set 400. In this embodiment, both the first and second users have access rights with respect to spreadsheet data set 400 and therefore can view the data in spreadsheet data set 400 on his or her respective display device. For example, each user's Web browser may display spreadsheet data set 400 in a format similar to that shown in FIG. 4. In one embodiment, online spreadsheet manager 130 transmits a first request (or other data) adapted to cause user device 160-A to display spreadsheet data set 400, and a second request (or other data) adapted to cause user device 160-B to display spreadsheet data set 400. The first user may then view spreadsheet data set 400 in window 407 displayed on user device 160-A, and the second user may view spreadsheet data set 400 in a similar window displayed on user device 160-B.

Suppose now that the first user wishes to make changes to spreadsheet data set 400, but does not want the changes to become permanent and does not want the second user to be able to view the changes. For example, the first user may wish to make a change to the data in a spreadsheet cell and test how the change affects data stored in other cells in the spreadsheet. In accordance with various embodiments, the first user may choose to view and edit a spreadsheet data set using a preview mode which allows only that user to view the user's edits.

In one embodiment, online spreadsheet manager 130 establishes and maintains a first data model associated with spreadsheet data set 400. All collaborating users can view, share, and edit the first data model. When a particular user selects an option to enter a preview mode, a "branch" of the first data model is created and stored separately. The "branch" of the first data model may be viewed and manipulated by the particular user as a personal preview data model. Only that particular user has access to and can view changes made to his or her personal preview data model. Subsequently, that particular user may apply any changes made to the personal preview model to the first data model, if he or she wishes. Alternatively, that particular user may delete the personal preview data model, or store the updated personal preview data model as a separate data model or file, without affecting the first data model.

Figure 5:
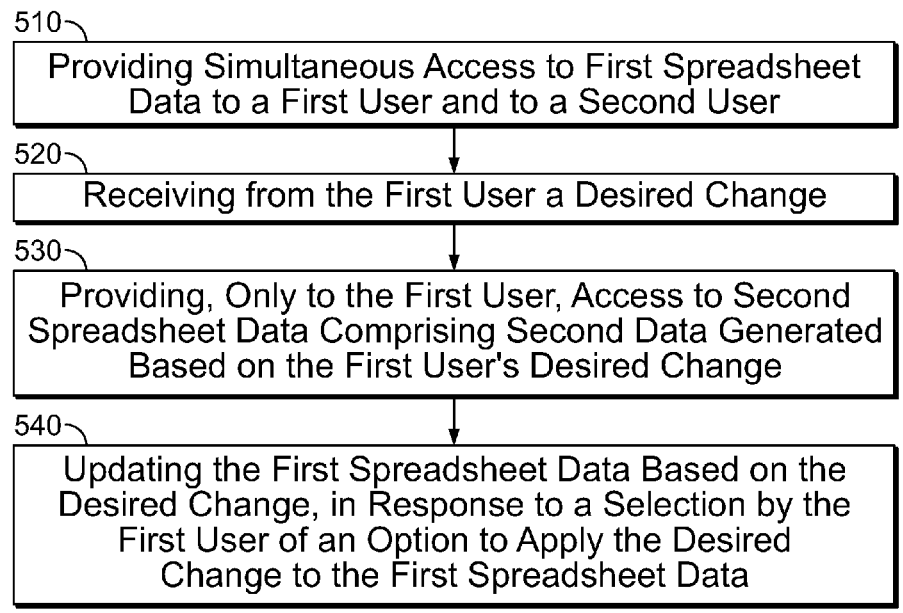
FIG. 5 is a flowchart of a method for providing spreadsheet data management services in accordance with an embodiment.

FIG. 5 is a flowchart of a method for displaying data in accordance with an embodiment. At step 510, simultaneous access to first spreadsheet data is provided to a first user and to a second user. In the manner described above, the first user and the second user log into their respective user accounts and access spreadsheet data set 400. Online spreadsheet manager 130 may verify the users' identities and access rights before allowing access to the spreadsheet data set.

Figure 4:
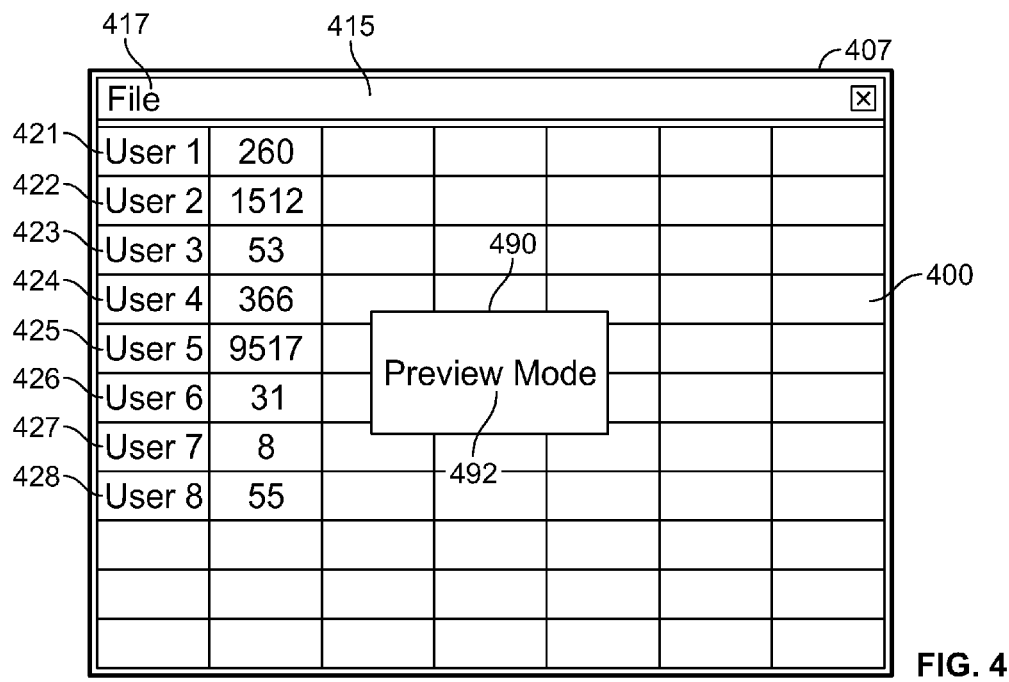
FIG. 4 shows a display of spreadsheet data in accordance with an embodiment.

A user may now select an option to enter a preview mode, in which the user may view and edit the spreadsheet data in spreadsheet data set 400 without the changes being visible to other users. In the illustrative embodiment, the first user selects a preview mode option while viewing spreadsheet data set 400 in window 407. Referring to FIG. 4, the first user right-clicks on a computer mouse, and in response, browser 210 displays an options menu 490 that includes a preview mode option 492. When the first user selects preview mode option 492, browser 210 transmits the user's selection to online spreadsheet manager 130.

Based on the first user's selection of the option to enter the preview mode, online spreadsheet manager 130 generates a separate data set that comprises the data in spreadsheet data set 400 and is accessible only to the first user. In the illustrative embodiment, in response to the first user's selection of preview mode option 492, spreadsheet preview 318 generates a copy of the information in spreadsheet data set 400, and saves the copy in spreadsheet data repository 325 as preview data set 600, as shown in FIG. 3. In one embodiment, spreadsheet data set 400 is stored in a first memory location and preview data set 600 is stored in a second memory location. Online spreadsheet manager 130 grants to the first user access rights with respect to preview data set 600, including viewing and editing rights, for example, while other users are granted no access rights with respect to preview data set 600. Other techniques may be used to store and maintain spreadsheet data set 400 and preview data set 600.

While in this illustrative embodiment the first user employs a computer mouse to select a preview mode from a menu, in other embodiments other techniques may be used to select and activate a preview mode.

Figure 6:
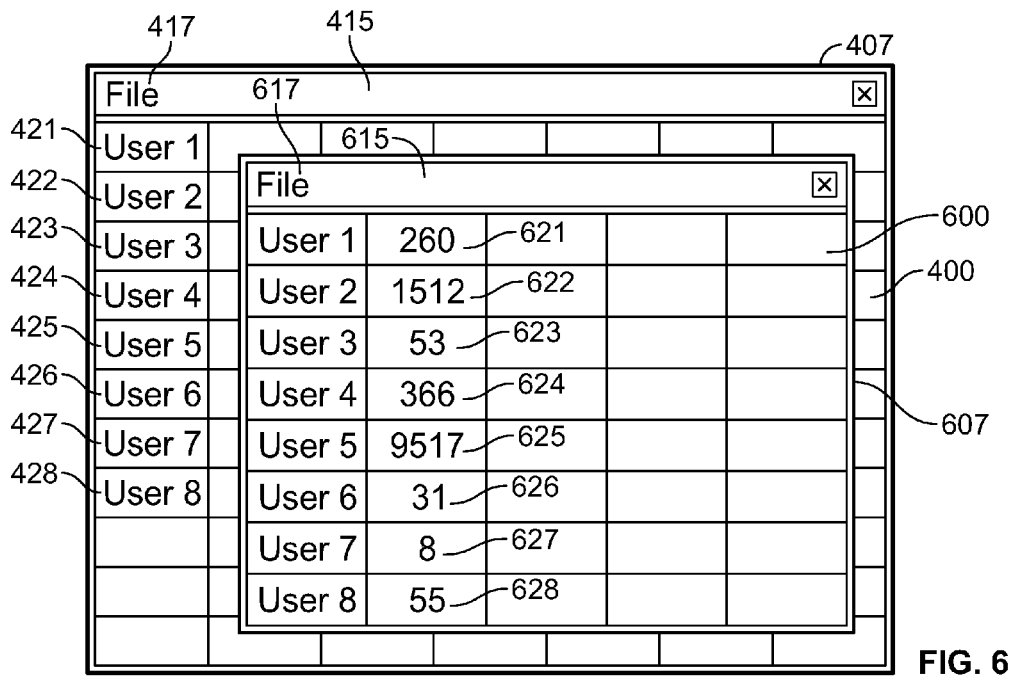
FIG. 6 shows a display of spreadsheet data in accordance with an embodiment.

To allow the first user to view preview data set 600, spreadsheet preview 318 transmits to user device 160-A a request, or other data, adapted to cause browser 210 to display a representation of preview data set 600. For example, online spreadsheet manager 130 may request that browser 210 display spreadsheet data set 400 in a first window and display preview data set 600 in a second window. Referring to FIG. 6, browser 210 responds by continuing to display spreadsheet data set 400 in first window 407, and by opening a second, preview window 607 on display 270 and displaying preview data set 600 in the preview window. All or a portion of preview data set 600 may be displayed in preview window 607. In this example, window 407, showing spreadsheet data set 400, is open in the background of display 270.

When browser 210 opens preview window 607 and displays preview data set 600, the information in preview data set 600 is the same as the information in spreadsheet data set 400. Referring to FIG. 6, row 621 of preview data set 600 corresponds to, and contains the same information (User 1, 260 points), as row 421 of spreadsheet data set 400; row 622 of preview data set 600 corresponds to, and contains the same information (User 2, 1512 points), as row 422 of spreadsheet data set 400, etc.

Suppose now that the first user wishes to make one or more desired changes to the information in preview data set 600. Suppose further that the first user does not want the second user to see the changes. In accordance with the exemplary embodiment, the first user may make changes to the information in preview data set 600 within preview window 607. Changes made by the first user to preview data set 600 are not seen by other users, and do not affect the information in spreadsheet data set 400, unless the first user selects an option to apply the changes to spreadsheet data set 400. As discussed above, while first user has access rights to preview data set 600, including viewing and editing rights, other users have no access rights with respect to preview data set 600.

Figure 7A:
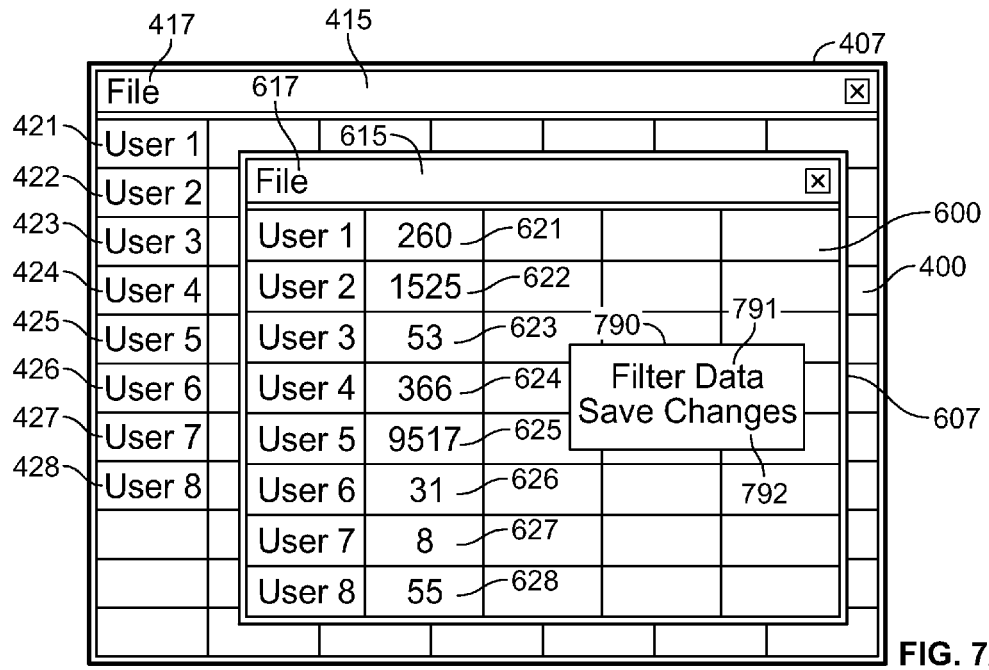
FIG. 7A shows a display of spreadsheet data in accordance with an embodiment.

Referring to FIG. 7A, the first user first changes the number of points associated with User 2, shown in row 622, from "1512" to "1525." In other embodiments, a user may make other types of changes to a preview data set. For example, a user may insert information into a spreadsheet cell, delete information from a spreadsheet cell, insert text into a document, delete text from a document, perform a selected filter operation with respect to data in a spreadsheet or other document, add or remove an image in a document, etc.

User device 160 transmits the first user's specified change to online spreadsheet manager 130. In one embodiment, user device 160 transmits information reflecting the user's specified change(s) to spreadsheet manager 130.

At step 520, spreadsheet preview 310 receives the information reflecting the first user's specified change and updates preview data set 600 in spreadsheet data repository 325. As discussed above, spreadsheet process 310 may also update certain cells in preview data set 600 based on the first user's change. For example, spreadsheet process 310 may update another row containing a value that is determined based on the information in row 622.

In another embodiment, user device 160 may perform certain calculations and other data processing associated with updating the information in preview data set 600, including updating other rows, columns, and cells affected by the first user's specified change. In this embodiment, user device 160 may transmit to online spreadsheet manager 130 information reflecting the first user's specified change and other changes made to preview data set 600 as a result of the change. Such calculations may be made by an appropriate application (not shown) residing on user device 160, for example. Spreadsheet process 310 updates preview data set 600 based on the information received from user device 160.

At step 530, access to second spreadsheet data comprising second data generated based on the first user's specified change is provided only to the first user. Online spreadsheet manager 130 transmits a request, or other data, adapted to cause browser 210 (on user device 160-A) to display the updated version of preview data set 600 in preview window 607. In response, browser 210 (on user device 160-A) displays the updated version of preview data set 600 in preview window 607 on display 270, as shown in FIG. 7A. Row 622 of preview data set 600 now contains the updated point value "1525." The data in rows 421-428 of spreadsheet data set 400, seen in window 407 on display 270, remain unchanged.

In one embodiment, spreadsheet data set 400 and preview data set 600 are made available to the first user as separate tabs in a spreadsheet application. When the first user selects a first tab, spreadsheet data set 400 is displayed. When the first user selects a second tab, preview data set 600 is displayed. Other methods for displaying spreadsheet data set 400 and preview data set 600 may be used.

While the first user views and edits preview data set 600 in preview window 607, the second user, having no access rights with respect to preview data set 600, cannot view or otherwise access preview data set 600. Online spreadsheet manager 130 does not transmit to user device 160-B any request, or other data, relating to preview data set 600.

Suppose now that the first user wishes to filter the data in preview data set 600. Referring to FIG. 7A, the first user right-clicks on a computer mouse to obtain an options menu 790, which contains a filter data option 791 and a save changes option 792. Wishing to filter preview data set 600, the user selects filter data option 791. In the illustrative example, the first user wishes to remove from preview data set all users who have accumulated less than fifty (50) points. In a well-known manner, the first user may cause a filter criteria window (not shown) to appear on display 270, and enter one or more filter criteria. Browser 210 transmits the user's filter criteria to online spreadsheet manager 130.

In this example, online spreadsheet manager 130 receives the first user's desired filter criteria, and spreadsheet process 310 filters preview data set 600 in accordance with the filter criteria. In this example, the rows pertaining to User 6 and User 7 are removed from preview data set 600 because User 6 and User 7 have each accumulated less than fifty points. Spreadsheet preview 318 updates preview data set 600 in spreadsheet data repository 325 to reflect the filtered results. In other embodiments, other types of data models associated with preview data set 600 may be updated to reflect the changes.

Figure 7B:
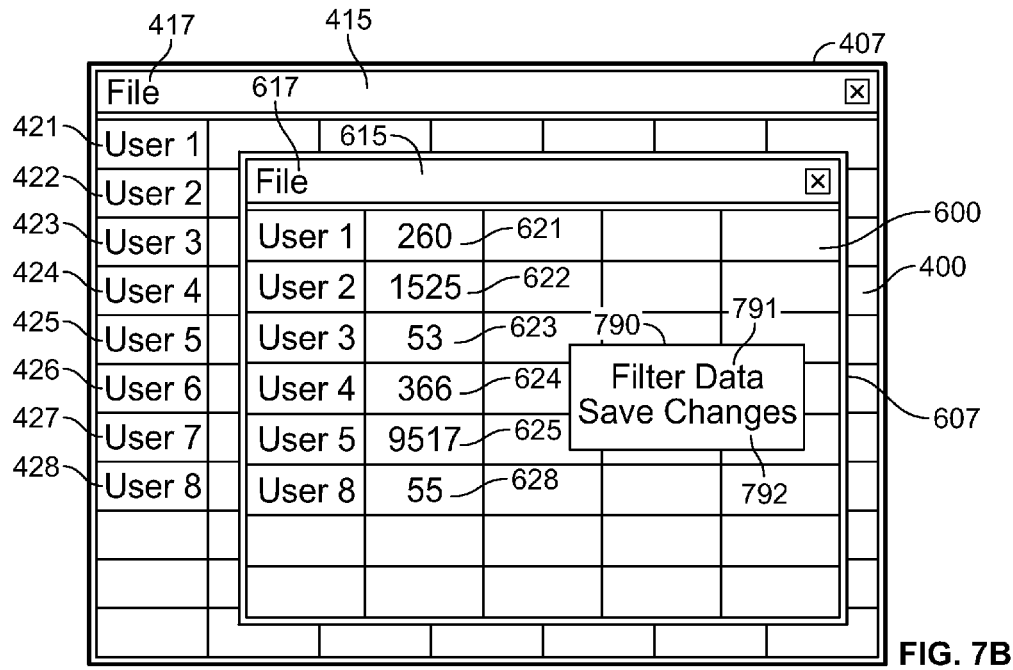
FIG. 7B shows a display of spreadsheet data in accordance with an embodiment.

Online spreadsheet manager 130 transmits to user device 160-A a request, or other data, adapted to cause browser 210 (on user device 160-A) to display the updated version of preview data set 600. In the exemplary embodiment, online spreadsheet manager 130 requests that browser 210 display updated preview data set 600 in preview window 607. In response, browser 210 displays the filtered version of preview data set 600 on display 270. The filtered preview data set 600 is displayed in preview window 607, as shown in FIG. 7B. Updated preview data set 600 includes rows 621-625 and row 628. Rows 626 and 627, which contained information pertaining to User 6 and User 7, respectively, have been removed. Rows 421-428 of spreadsheet data set 400 (shown in window 407, in the background) remain unchanged.

Suppose now that, after making several desired changes to preview data set 600, the first user wishes to apply the changes to spreadsheet data set 400 so that the changes become permanent, and so that the second user can view the changes. Referring again to FIG. 7B, the first user right-clicks on a computer mouse, and in response, browser 210 again displays options menu 790. The first user now selects save changes option 792, and browser 210 transmits the user's selection to online spreadsheet manager 130.

At step 540, the first spreadsheet data is updated based on the specified change, in response to a selection by the first user of an option to apply the desired change to the first spreadsheet data. In the present example, in response to the user's selection, spreadsheet preview 318 updates spreadsheet data set 400 to include the changes made by the first user. Updated spreadsheet data set 400 is saved in spreadsheet data repository 325. In other embodiments, other types of data models associated with spreadsheet data set 400 may be updated to reflect the changes made by the first user. Online spreadsheet manager 130 transmits a request, or other data adapted to cause browser 210 to display updated spreadsheet data set 400. In response, browser 210 displays all or a portion of updated spreadsheet data set 400.

Figure 8:
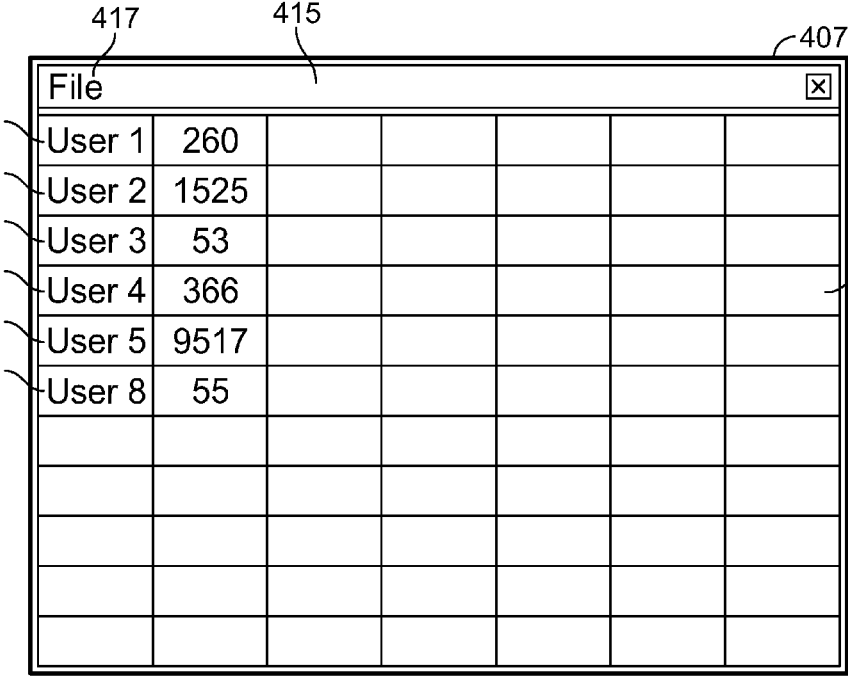
FIG. 8 shows a display of spreadsheet data in accordance with an embodiment.

In the present example, the first user exits preview mode by, for example, closing preview window 607, and views updated spreadsheet data set 400 in window 407, as shown in FIG. 8. Updated spreadsheet data set 400 includes updated row 422, which now indicates that User 2 has accumulated 1525 points. The information in updated spreadsheet data set 400 has also been filtered based on the first user's filter criteria. Specifically, updated spreadsheet data set 400 includes rows 421-425 and row 428, but does not include rows 426 or 427.

Updated spreadsheet data set 400 is also displayed to the second user. Specifically, online spreadsheet manager 130 transmits to user device 160-B a request, or other data, adapted to cause user device 160-B to display updated spreadsheet data set 400. In response, user device 160-B displays all or a portion of updated spreadsheet data set 400 to the second user.

If the first user makes desired changes to preview data set 600 and then decides that he or she does not wish to apply the changes to spreadsheet data set 400, the first user may store preview data set 600 as a separate spreadsheet data set. For example, the first user may select an option to save preview data set 600 as a new spreadsheet data set, or as a new file; the new spreadsheet data set is then saved in a separate memory location in spreadsheet data repository 325. The first user may alternatively choose to delete preview data set 600.

Figure 9:
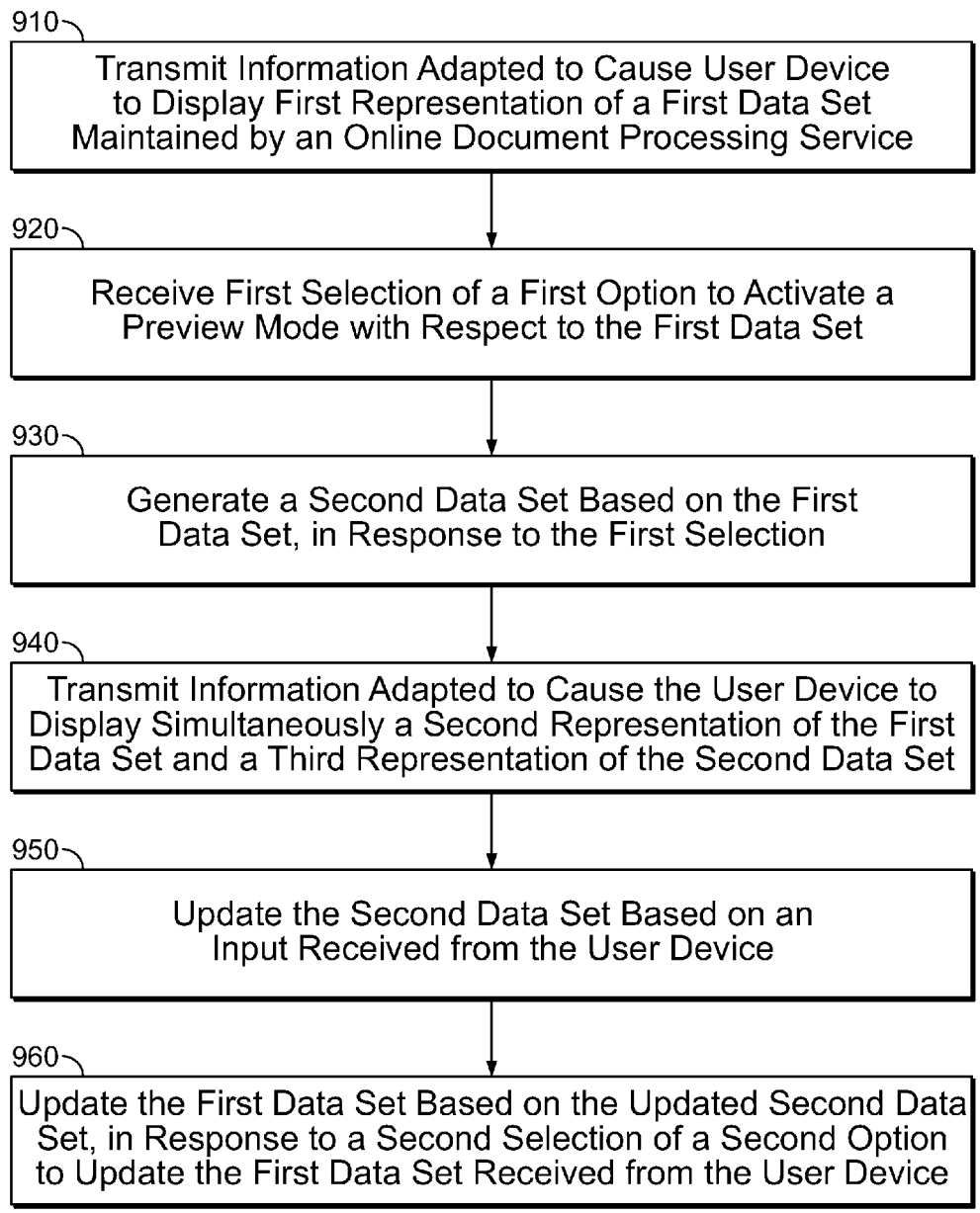
FIG. 9 is a flowchart depicting a method of providing online data management services in accordance with an embodiment.

FIG. 9 is a flowchart depicting a method of providing online data management services, in accordance with another embodiment. At step 910, first information adapted to cause a user device to display a first representation of a first data set maintained by an online document processing service is transmitted. As discussed above, spreadsheet preview 318 may transmit a request that browser 210 display spreadsheet data set 400 in a first window.

At step 920, a first selection of a first option to activate a preview mode with respect to the first data set is received. As discussed above, online spreadsheet manager 130 may receive a user's selection of preview mode option 492. At step 930, a second data set based on the first data set is generated in response to the first selection. Online spreadsheet manager 130 generates preview data set 600. At step 940, second information adapted to cause the user device to display simultaneously a second representation of the first data set and a third representation of the second data set is transmitted. As discussed above, spreadsheet preview 318 may transmit a request that browser 210 display spreadsheet data set 400 in the first window and preview data set 600 in a second window.

At step 950, the second data set is updated based on an input received from the user device. Online spreadsheet manager 130 edits and updates preview data set 600 based on the user's specified changes. At step 960, the first data set is updated based on the updated second data set, in response to a second selection of a second option to update the first data set received from the user device. When the user selects save changes option 792, spreadsheet data set 400 is updated based on the updated preview data set 600.

While the exemplary embodiments described herein include systems, apparatus, and methods used to provide online spreadsheet data management services and to allow a user to use a preview mode to view and edit spreadsheet data, these exemplary embodiments are not limiting. The systems, apparatus, and methods described herein may be used to provide collaborative online data management services in connection with other types of data, and may be used to allow a user to use a preview mode to view and edit other types of data. For example, the systems, apparatus, and methods described herein may be used to provide collaborative online word processing services, and to allow a user to use a preview mode to view and edit text documents and other documents generated and maintained by an online word processing application or system. The systems, apparatus, and methods described herein may be used to provide collaborative online data management services pertaining to, and to allow a user to use a preview mode to view and edit, text data, graphical data, slide show data, image data, photographic data, numerical data, data from external databases, etc.

In various embodiments, the method steps described herein, including the method steps described in FIGS. 5 and/or 9, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 5 and/or 9. Certain steps of the methods described herein, including one or more of the steps of FIGS. 5 and/or 9, may be performed by a server or by another processor in a network-based cloud-computing system. Certain steps of the methods described herein, including one or more of the steps of FIGS. 5 and/or 9, may be performed by a client computer in a network-based cloud computing system. The steps of the methods described herein, including one or more of the steps of FIGS. 5 and/or 9, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 5 and/or 9, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 10:
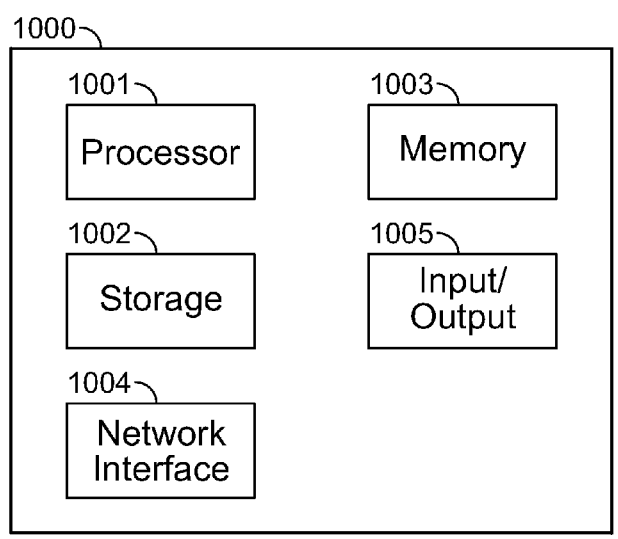
FIG. 10 shows components of an exemplary computer.

A high-level block diagram of an exemplary computer that may be used to implement systems, apparatus and methods described herein is illustrated in FIG. 10. Computer 1000 comprises a processor 1001 operatively coupled to a data storage device 1002 and a memory 1003. Processor 1001 controls the overall operation of computer 1000 by executing computer program instructions that define such operations. The computer program instructions may be stored in data storage device 1002, or other computer readable medium, and loaded into memory 1003 when execution of the computer program instructions is desired. Thus, the method steps of FIGS. 5 and/or 9 can be defined by the computer program instructions stored in memory 1003 and/or data storage device 1002 and controlled by the processor 1001 executing the computer program instructions. For example, the computer program instructions can be implemented as computer executable code programmed by one skilled in the art to perform an algorithm defined by the method steps of FIGS. 5 and/or 9. Accordingly, by executing the computer program instructions, the processor 1001 executes an algorithm defined by the method steps of FIGS. 5 and/or 9. Computer 1000 also includes one or more network interfaces 1004 for communicating with other devices via a network. Computer 1000 also includes one or more input/output devices 1005 that enable user interaction with computer 1000 (e.g., display, keyboard, mouse, speakers, buttons, etc.).

Processor 1001 may include both general and special purpose microprocessors, and may be the sole processor or one of multiple processors of computer 1000. Processor 1001 may comprise one or more central processing units (CPUs), for example. Processor 1001, data storage device 1002, and/or memory 1003 may include, be supplemented by, or incorporated in, one or more application-specific integrated circuits (ASICs) and/or one or more field programmable gate arrays (FPGAs).

Data storage device 1002 and memory 1003 each comprise a tangible non-transitory computer readable storage medium. Data storage device 1002, and memory 1003, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1005 may include peripherals, such as a printer, scanner, display screen, etc. For example, input/output devices 1005 may include a display device such as a cathode ray tube (CRT) or liquid crystal display (LCD) monitor for displaying information to the user, a keyboard, and a pointing device such as a mouse or a trackball by which the user can provide input to computer 1000.

Any or all of the systems and apparatus discussed herein, including online spreadsheet manager 130, user device 160, and components thereof, including web browser 210, display 270, spreadsheet process 310, spreadsheet preview 318, and spreadsheet data repository 325, may be implemented using a computer such as computer 1000.

One skilled in the art will recognize that an implementation of an actual computer or computer system may have other structures and may contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

The invention claimed is:

1. A method for providing online data management services, the method comprising:
   providing access to first data to a first user and to a second user;
   providing, only to the first user, access to second data that is a copy of the first data, in response to a selection by the first user of a preview option with respect to the first data;
   receiving from the first user a specified change to the second data;
   providing, only to the first user, an update option to update the first data based on the specified change; and
   updating the first data based on the specified change, in response to a selection by the first user of the update option.

2. The method of claim 1, further comprising:
   providing simultaneous access to first data to a first user and to a second user.

3. The method of claim 1, further comprising:
   providing simultaneous access to the updated first data to the first user and to the second user.

4. The method of claim 3, further comprising:
   providing to the first user access to the first data via a first network browser operating on a first user device; and
   providing to the second user access to the first data via a second network browser operating on a second user device.

5. The method of claim 4, further comprising:
   receiving from the first user a selection of the preview option.

6. The method of claim 5, further comprising:
   transmitting to the first user device a request that the first user device display the second data.

7. The method of claim 6, further comprising:
   transmitting to the first network browser a first request to display the first data in a first window and a second request to display the second data in a second window.

8. The method of claim 1, wherein:
   the first data is stored in a first memory location; and
   the second data is stored in a second memory location.

9. The method of claim 1, further comprising:
   maintaining a first thread associated with the first data and a second thread associated with the second data.

10. The method of claim 1, further comprising:
    receiving filter criteria from the first user; and
    filtering the second data based on the filter criteria.

11. The method of claim 1, wherein the first data comprises at least one of: spreadsheet data, text data generated by a word processing application, graphical data, image data, and slide show data.

12. The method of claim 1, wherein the change comprises at least one of: an insertion of information in a spreadsheet cell, a deletion of information in a spreadsheet cell, an insertion of text in a document, a deletion of text in a document, and a selected filter operation with respect to data in a spreadsheet.

13. A non-transitory computer readable medium having program instructions stored thereon, that, in response to execution by a processor, cause the processor to perform operations comprising:
    providing access to first data to a first user and to a second user;

providing, only to the first user, access to second data that is a copy of the first data, in response to a selection by the first user of a preview option with respect to the first data;

receiving from the first user a specified change to the second data;

providing, only to the first user, an update option to update the first data based on the specified change; and updating the first data based on the specified change, in response to a selection by the first user of option.

14. The non-transitory computer readable medium of claim 13, the operations further comprising:

providing simultaneous access to first data to a first user and to a second user.

15. The non-transitory computer readable medium of claim 13, the operations further comprising:

providing simultaneous access to the updated first data to the first user and to the second user.

16. The non-transitory computer readable medium of claim 15, the operations further comprising:

providing to the first user access to the first data via a first network browser operating on a first user device; and providing to the second user access to the first data via a second network browser operating on a second user device.

17. A method for providing online data management services, the method comprising:

transmitting first information adapted to cause a first user device to display a first representation of a first data set maintained by an online document processing service;

transmitting second information adapted to cause a second user device to display a second representation of the first data set;

receiving from the first user device a first selection of a preview option to activate a preview mode with respect to the first data set;

in response to the first selection, generating a second data set based on the first data set;

transmitting second information adapted to cause the first user device to display simultaneously a third representation of the first data set and a fourth representation of the second data set;

updating the second data set based on an input received from the first user device; and updating the first data set based on the updated second data set.

18. The method of claim 17, wherein the first information adapted to cause a first user device to display the first representation of the first data comprises a request that a browser display the first representation of the first data.

19. The method of claim 17, wherein the second information adapted to cause the first user device to display simultaneously the third representation of the first data set and the fourth representation of the second data set comprises a request that a browser display the third representation of the first data set and the fourth representation of the second data set.

20. The method of claim 19, wherein the second information adapted to cause the first user device to display simultaneously the third representation of the first data set and the fourth representation of the second data set comprises a request that a browser display simultaneously the third representation of the first data set in a first window and the fourth representation of the second data set in a second window.

* * * * *